United States Patent Office 2,773,101
Patented Dec. 4, 1956

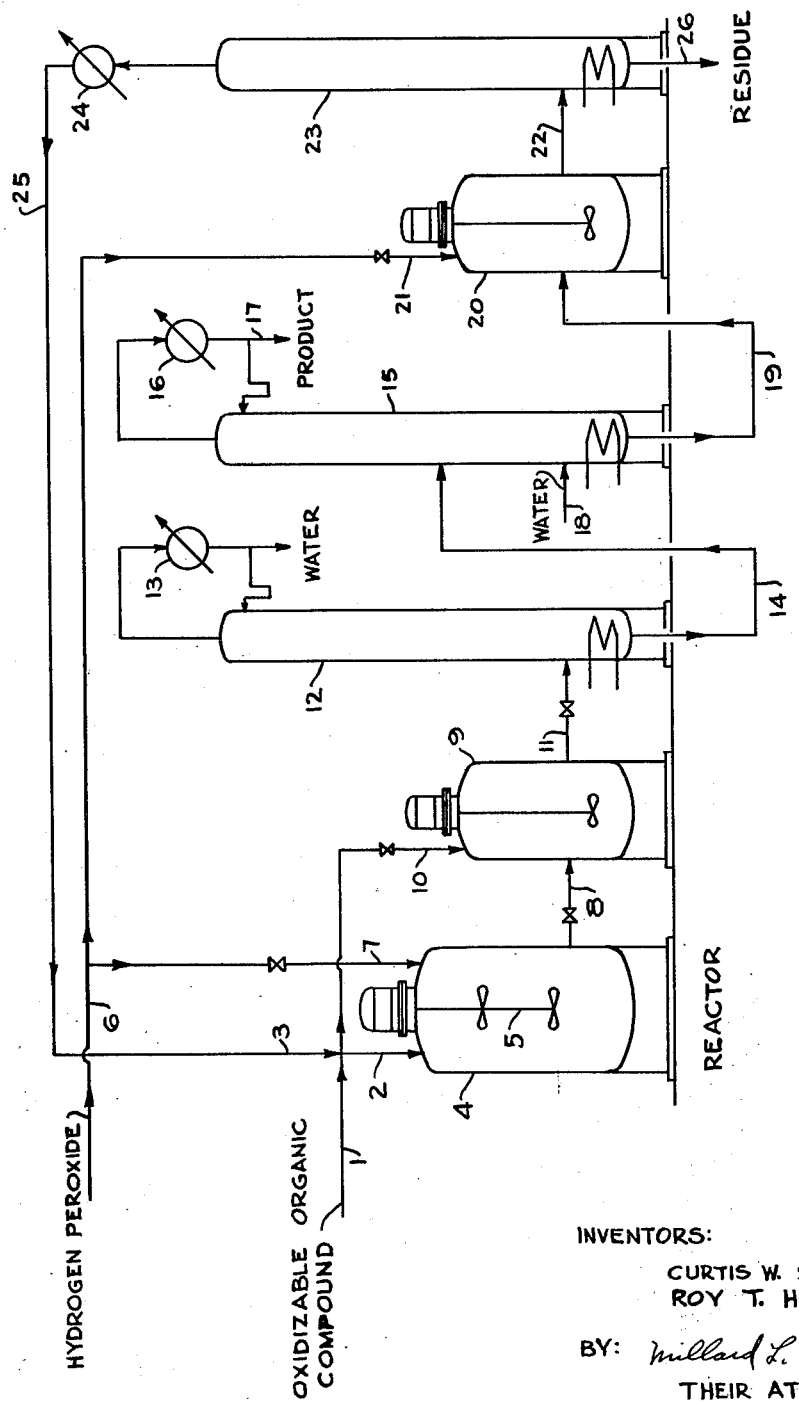

2,773,101

CATALYTIC REACTIONS WITH OSMIUM OXIDE CATALYSTS

Curtis W. Smith and Roy T. Holm, Berkeley, Calif., assignors to Shell Development Company, Emeryville, Calif., a corporation of Delaware Application July 25, 1952, Serial No. 300,926

4 Claims. (Cl. 260—635)

This invention relates to organic chemical reactions carried out under the catalytic influence of osmium oxide. It deals with an improved method of carrying out such reactions whereby more efficient use is made of the osmium oxide catalyst.

Osmium oxides, particularly the tetroxide, are known to be highly effective in catalyzing a great many reactions of organic compounds. Osmium tetroxide is especially advantageous for promoting oxidation reactions of various kinds, some of which cannot be carried out with any other type of catalyst. Even where other catalysts can be used, they are often less selective, require more drastic conditions and/or result in lower yields or conversions, or both. In spite of the many advantages of osmium oxides as catalysts, their use has largely been restricted to reactions on a laboratory scale. This has been due not only to the very high cost of these catalysts and the difficulty in avoiding their loss during recovery of the product, but also because the osmium oxides can produce serious physiological effects on humans so must be handled with extreme care and removed very completely from any product which is to be sold.

It is an object of the present invention to provide a commercially available method of carrying out chemical reactions of organic compounds in the presence of osmium oxides with minimum loss of osmium oxide catalyst in the process. Another object is the provision of a method for the complete separation in a cheap and economical manner of osmium tetroxide from vaporizable organic compounds produced under the catalytic influence thereof, without substantial loss of either catalyst or product. A special object of the invention in one of its preferred modifications is to provide an improved method for recovering osmium tetroxide from reaction mixtures obtained in oxidizing organic compounds with peroxides, particularly hydroxylating olefinic compounds with hydrogen peroxide when using osmium tetroxide as catalyst for the oxidation. Still other objects and advantages of the new method will be apparent from the following description of the invention.

The new method of the invention takes advantage of the fact that osmium forms two oxides which differ greatly in volatility and are readily converted from one form to the other. These oxides are the dioxide ($OsO_2$), which has a low volatility and does not distill even under high vacuum, and the tetroxide ($OsO_4$) which boils at about 100° C. at ordinary atmospheric pressure. The dioxide is rapidly oxidized, especially by peroxides, although also by air and other oxidizing agents, to osmium tetroxide. Osmium tetroxide can be reduced readily to the dioxide by oxidizable compounds, compounds whose oxidation is catalyzed by osmium tetroxide being particularly suitable for such reduction. Based upon these differences in volatility of these osmium oxides, a method for removing osmium oxides from organic reaction mixtures has been developed which is relatively simple and inexpensive to operate and is very effective in recovering osmium oxide from reaction mixtures while obtaining organic reaction products essentially free from osmium.

In accordance with the invention, the osmium oxide is recovered from reaction mixtures in which it has been used to catalyze an organic chemical reaction which results in a volatile organic reaction product, by converting the osmium oxide first to the non-volatile dioxide form in the reaction mixture, then distilling the mixture to remove the volatile organic reaction product or products therefrom, after which sufficient of an oxidizing agent to convert the osmium oxide to the volatile tetroxide form is added to the undistilled residue, and the osmium tetroxide is distilled off. The thus recovered osmium oxide can be reused in the process repeatedly and, due to the efficiency of its recovery, the cost of catalyst for the process is quite low.

The exact method used for carrying out the different steps of the recovery process can be varied depending upon the particular organic chemical reaction in which the osmium oxide is being used as catalyst. For example, where an oxidation reaction is being carried out, the step of converting the catalyst to osmium dioxide can be effected after completion of the reaction by adding to the reacted mixture a small excess of the oxidizable reactant which is being oxidized in the process and heating to reduce any higher osmium oxides present. Alternatively, the reduction of the osmium oxide to the nonvolatile dioxide can be carried out in the course of the osmium oxide-catalyzed oxidation reaction itself instead of as a separate subsequent operation. Thus, by terminating the oxidation in the presence of an excess of the oxidizable reactant being treated under osmium tetroxide reduction conditions, a reacted mixture containing all the osmium oxide in the form of dioxide can be obtained. It is, of course, feasible to use for the reaction of the osmium tetroxide some other oxidizable compound than that being oxidized in the process. Olefinic compounds, for instance, can always be used. However, it is usually desirable in such cases to choose a compound which is easily removable, and forms an oxidation product in the osmium oxide reduction which is also easily separated from the desired final organic reaction product. As a rule, the compound being oxidized in the process is preferred as a reducing agent since it introduces no additional separation problems.

After reduction of the osmium tetroxide to the non-volatile dioxide, the reaction mixture is distilled to take overhead the volatile product of the reaction essentially free from osmium oxide. Any suitable distillation method using ordinary, reduced or superatmospheric pressure as most convenient, depending upon the nature, particularly the boiling point, of the product which is being recovered, can be used. Distillation with steam or other gases is often useful in this step of the process, the low volatility of osmium dioxide under such distillation conditions making it easy to effect practically quantitative separations. By-products, solvents, and/or other components of the reaction mixture which it is desirable to separate from the catalyst can also be removed advantageously at this stage of the process, if desired. Fractional distillation can be employed to take off such other components separately from the desired product. Extractive distillation with a suitable solvent or solvents for one or more of the components can be used to aid such separation of the product of the osmium oxide-catalyzed reaction. Alternatively, the product can be taken off together with one or more other volatile components of the reaction mixture and purified, if necessary, in a separate operation. In any case, the osmium dioxide will remain as an undistilled residue with or without other high boiling materials after separation of the volatile product, such volatile products being understood as those more volatile than the osmium dioxide from which they are to be separated in this step of the process.

After removal of the volatile product or products from the osmium dioxide-containing distillation bottoms, these bottoms are treated with an oxidizing agent to convert the osmium dioxide to the volatile tetroxide. It is usually advantageous to dilute the bottoms with a suitable inert liquid, for example, water, in order to promote contact between the osmium dioxide and the oxidizing agent used. Where the process is being carried out in conjunction with an osmium oxide-catalyzed oxidation reaction, the same oxidizing agent can be employed advantageously for oxidizing the dioxide to the tetroxide. Hydrogen peroxide is an especially suitable oxidizing agent, but other inorganic peroxides or organic peroxides can also be used. Sodium and barium peroxides are examples of such other inorganic peroxides, while suitable organic peroxides include, for instance, tertiary butyl peroxide or hydroperoxide, benzoyl peroxide, and the like. Oxidation with air, perchlorates, nitric acid, chlorine water and the like is also effective for this step of the process. The oxidation can usually be carried out at ordinary temperatures with vigorous oxidizing agents such as peroxides, although higher or lower temperatures can be used with these or other oxidizing agents. Stoichiometric amounts, or preferably a slight excess of oxidizing agent, based upon the amount of osmium oxide to be oxidized, are usually sufficient.

Upon completion of the oxidation of the osmium dioxide to tetroxide, the mixture is distilled to take overhead the osmium tetroxide. Distillation with steam is usually advantageous in giving an aqueous solution of osmium tetroxide which can be used directly as catalyst in the original or other suitable reaction. In some cases there may be produced in the osmium oxide-promoted reaction an organic product or by-product which cannot be distilled without decomposition and so will not be removed in the previously described distillation for separating the volatile products of the reaction from the osmium dioxide. Such difficultly distillable materials can be recovered by oxidizing the dioxide and distilling off the resulting osmium tetroxide.

The attached drawing is a flow sheet or diagrammatic representation, not to scale, of one advantageous method of carrying out the osmium oxide recovery process as applied to the recovery of catalyst in the hydroxylation of water-soluble olefinic compounds with hydrogen peroxide. In order to simplify the description, the hydroxylation of allyl alcohol will be used as an illustration of this type of reaction in which the new process is especially advantageous. It will be understood, however, that the principles of the invention thus illustrated can be applied not only in other oxidation reactions, but also in any other types of osmium oxide-catalyzed reactions of organic compounds.

As shown in the drawing, the olefinic feed, in the present case an aqueous solution of allyl alcohol, is fed by lines 1 and 2, together with osmium tetroxide catalyst in aqueous solution introduced by line 3, preferably in an amount of about 0.001% to about 0.5% based on the weight of allyl alcohol fed, to reactor 4. Reactor 4 is shown as a vessel provided with a stirrer 5 and arranged for batchwise operation. This reactor is provided with cooling means, not shown. Into the stirred charge of aqueous allyl alcohol, preferably of about 25% to about 75% concentration, is fed by lines 6 and 7 hydrogen peroxide, advantageously as a solution of about 10% to 35% concentration. About 0.9 to 1.0 mole of hydrogen peroxide per mole of allyl alcohol is added over a period of about 2.5 to 3.5 hours while vigorously stirring and maintaining a temperature of about 30° C.–35° C. On completion of the reaction, the mixture is withdrawn by line 8 to stirred reactor 9 in which the mixture is heated, by means not shown, to about 60° C.–80° C. with a slight excess of allyl alcohol added by lines 1 and 10, to bring about complete reduction of the osmium tetroxide to the dioxide.

The reacted mixture from unit 9 is withdrawn by line 11 to distillation column 12 in which the water is removed overhead and condensed in condenser 13. This distillation is advantageously carried out under reduced pressure, 100 mm. of mercury and a maximum kettle temperature of 70° C. being suitable. The bottom product from column 12 is removed by line 14 and fed to column 15 which is preferably operated at a lower pressure, for example, about 0.1 mm. of mercury, to remove overhead water-white glycerine which is condensed in condenser 16 and withdrawn by line 17. After removal of the glycerine, water is added by line 18 to the residue in column 16 and the mixture flushed into vessel 20 via line 19. Sufficient hydrogen peroxide is introduced by lines 6 and 21 to dissolve the black precipitate of osmium dioxide present, and the mixture is stirred until oxidation of the dioxide to osmium tetroxide is complete. The mixture is then fed by line 22 to still 23 in which the osmium tetroxide is distilled with steam and condensed as an aqueous solution in condenser 24.

By this method of operation, a 91.3% conversion of distilled allyl alcohol to glycerine was obtained in a yield of 93.2% based on the hydrogen peroxide, and 95% based on the allyl alcohol, used. The glycerine was recovered as a 20% solution, from which water-white glycerine of 97.4% purity, boiling 128° C.–132° C., was obtained. Tests with radioactive osmium showed that the reduction of the osmium tetroxide with allyl alcohol in unit 9 was essentially quantitative since the glycerol product contained only 0.019±0.0035% and the overhead product from column 12 contained only 0.0063±0.0051% of the osmium used. The recovery of osmium tetroxide by steam distillation in column 23 was 97% as determined by analysis of the aqueous solution from condenser 24 using the strong characteristic absorption in the 2300–3100 A region characteristic of osmium tetroxide as the measure of the osmium tetroxide content.

The process is equally successful in the recovery of osmium tetroxide used as catalyst for the hydroxylation of olefinic aldehydes as described in copending application Serial No. 296,242, filed June 28, 1952, now Patent No. 2,718,529, where it may be used to separate osmium oxide from the hydroxylation product. Other types of osmium tetroxide-catalyzed reactions in which this method of recovering the catalyst can be successfully used are, for instance, the conversion of vinyl esters or ethers, e. g. vinyl acetate or divinyl ether, to glycolaldehyde and other reactions described in Milas patent—U. S. 2,402,566, for example. The oxidation of olefins to ketones or aldehydes, for instance, the production of dodecanones by reacting propylene tetramer with hydrogen peroxide in tertiary butyl alcohol solution at 50° C. in the presence of osmium tetroxide catalyst, is another example of a process in which the present method is useful. The catalyst recovery method is equally effective when used in conjunction with reactions in which the osmium oxide is employed to catalyze other reactions than oxidations.

We claim as our invention:

1. In a process of hydroxylating an olefinic compound by reaction with hydrogen peroxide under the catalytic influence of osmium tetroxide, the improved method of recovering catalyst from the reaction mixture which comprises adding to the reacted mixture sufficient of said olefinic compound to react with the osmium tetroxide present, heating the mixture to about 60° C. to 100° C. to convert the osmium tetroxide to dioxide before distillation of the reaction mixture, then distilling the mixture to remove hydroxylation product therefrom, adding sufficient hydrogen peroxide to the remaining undistilled osmium dioxide to oxidize said dioxide to the tetroxide, distilling off osmium tetroxide from the mixture, and using the thus recovered tetroxide to catalyze further reaction.

2. In a process of hydroxylating an olefinic compound by reaction with hydrogen peroxide under the catalytic influence of osmium tetroxide, the improved method of recovering catalyst from the reaction mixture which comprises adding to the reacted mixture sufficient of said olefinic compound to reduce the osmium tetroxide to dioxide before distillation of the reaction mixture, then distilling the osmium dioxide-containing product to remove hydroxylation product therefrom, adding hydrogen peroxide to the undistilled residue of said distillation in an amount sufficient to convert the osmium dioxide therein to osmium tetroxide, distilling off the thus formed osmium tetroxide and using the thus recovered tetroxide to catalyze further reaction.

3. A process in accordance with claim 2 wherein the osmium tetroxide is distilled with steam and condensed to form an aqueous solution of osmium tetroxide which is returned to supply catalyst for the hydroxylation reaction.

4. In a process of producing glycerol by hydroxylating allyl alcohol with hydrogen peroxide under the catalytic influence of osmium tetroxide, the improvement which comprises adding to the reacted mixture sufficient allyl alcohol to reduce the osmium tetroxide to dioxide before distillation of the reaction mixture, then distilling the osmium dioxide-containing product to remove glycerol therefrom, adding hydrogen peroxide to the undistilled residue of said distillation in an amount sufficient to convert the osmium dioxide therein to osmium tetroxide, distilling off the thus formed osmium tetroxide, and using the thus recovered tetroxide to catalyze further reaction.

References Cited in the file of this patent
UNITED STATES PATENTS

| | | |
|---|---|---|
| 2,271,083 | Lorand | Jan. 27, 1942 |
| 2,437,648 | Milas | Mar. 9, 1948 |
| 2,610,907 | Stein et al. | Sept. 16, 1952 |
| 2,613,223 | Young | Oct. 7, 1952 |

OTHER REFERENCES

Mellor: "A Comprehensive Treatise on Inorganic and Theoretical Chemistry" vol. 15, pp. 703, 707, 711 and 712. Publ. by Longmans Green & Co., New York, N. Y. (1936).

Mugdan et al: Jour. Chem. Soc., London, 1949, pages 2989–90.